United States Patent
Tien

(10) Patent No.: US 7,852,804 B2
(45) Date of Patent: Dec. 14, 2010

(54) COMMUNICATION SYSTEM AND COMMUNICATION APPARATUS SWITCHING METHOD THEREOF

(75) Inventor: Kai-Wen Tien, Tao Yuan Shien (TW)

(73) Assignee: Quanta Computer, Inc. (TW)

( * ) Notice: Subject to any disclaimer, the term of this patent is extended or adjusted under 35 U.S.C. 154(b) by 657 days.

(21) Appl. No.: 11/984,631

(22) Filed: Nov. 20, 2007

(65) Prior Publication Data

US 2009/0003273 A1 Jan. 1, 2009

(30) Foreign Application Priority Data

Jun. 27, 2007 (TW) .............................. 96123188 A

(51) Int. Cl.
H04J 1/16 (2006.01)
H04L 12/56 (2006.01)
(52) U.S. Cl. .................... 370/328; 370/252; 370/401
(58) Field of Classification Search ................. 370/252, 370/328, 329, 401
See application file for complete search history.

(56) References Cited

U.S. PATENT DOCUMENTS

2003/0225893 A1 * 12/2003 Roese et al. ................. 709/227

* cited by examiner

Primary Examiner—John Pezzlo
(74) Attorney, Agent, or Firm—Thomas, Kayden, Horstemeyer & Risley, LLP.

(57) ABSTRACT

The invention provides a communication apparatus switching method. At first, the method of the invention measures at least one environmental parameter relative to a neighboring region of a mobile communication apparatus and then determines whether the mobile communication apparatus is indoors, based on the at least one environmental parameter. If YES, the following steps are executed. Firstly, the method establishes a wireless communication link between the mobile communication apparatus and an agent communication apparatus based on a wireless communication protocol. Then, the method sends a piece of user information to the agent communication apparatus. Afterward, the method terminates a first radio telecommunication link between the mobile communication apparatus and the base station. Finally, the method establishes a second radio telecommunication link between the agent communication apparatus and the base station based on a radio telecommunication protocol.

20 Claims, 7 Drawing Sheets

COMMUNICATION SYSTEM AND COMMUNICATION APPARATUS SWITCHING METHOD THEREOF

BACKGROUND OF THE INVENTION

1. Field of the Invention

This invention relates to a communication system and a communication apparatus switching method thereof, and more particularly, to a communication system and a method for switching a mobile communication apparatus to an agent communication apparatus to communicate with a base station.

2. Description of the Prior Art

A mobile communication apparatus, such as a mobile phone, is a common electronic device, which allows a user to use various kinds of radio telecommunication services through a radio telecommunication link by establishing the radio telecommunication link with a base station.

However, when a user carries a mobile communication apparatus indoors, the mobile communication apparatus is required to maintain a radio telecommunication link, and the user also needs to carry the mobile communication apparatus as a carry-on item. It causes users much inconvenience.

Moreover, when the user carries the mobile communication apparatus indoors, the mobile communication apparatus may consume too much power if ceaselessly keeping switching on.

Accordingly, one scope of the invention is to provide a communication system and a communication apparatus switching method thereof for solving the above-mentioned problems.

SUMMARY OF THE INVENTION

One scope of the invention is to provide a communication system and a communication apparatus switching method thereof for switching a mobile communication apparatus to an agent communication apparatus to communicate with a base station. The system and the method determine whether the mobile communication apparatus is indoors by detecting environmental parameters. If YES, the agent communication apparatus replaces the mobile communication apparatus to establish a radio telecommunication link between the agent communication apparatus and the base station. Thus, a user can use various kinds of provided radio telecommunication services through the base station conveniently by using the agent communication apparatus cooperated with indoor communication links. In addition, the time of putting the mobile communication apparatus in use can be reduced to save power.

A method according to an embodiment of the invention includes the steps of firstly measuring at least one environmental parameter relative to a neighboring region of a mobile communication apparatus, and then determining whether the mobile communication apparatus is indoors based on the at least one environmental parameter. If YES, the following steps are executed. First, establish a wireless communication link between the mobile communication apparatus and the agent communication apparatus in a wireless communication protocol. Then, send a piece of user information to the agent communication apparatus. Next, send a terminating signal to the mobile communication apparatus. After that, terminate the first radio telecommunication link between the mobile communication apparatus and the base station. Finally, establish a second radio telecommunication link between the agent communication apparatus and the base station in a radio telecommunication protocol.

A communication system according to an embodiment of the invention includes a base station, an agent communication apparatus, and a mobile communication apparatus. The mobile communication apparatus is capable of measuring at least one environmental parameter relative to a neighboring region thereof, determining whether the mobile communication apparatus is indoors based on the at least one environmental parameter. If the mobile communication apparatus is not indoors, the mobile communication apparatus is expected to be outdoors. Therefore, the mobile communication apparatus is required to maintain or establish a first radio telecommunication link with the base station in a radio telecommunication protocol. However, if the mobile communication apparatus is indoors, the mobile communication apparatus establishes a wireless communication link with the agent communication apparatus in a wireless communication protocol. Then, the mobile communication apparatus sends a piece of user information to the agent communication apparatus. Next, the agent communication apparatus sends a terminating signal to the mobile communication apparatus. After that, the mobile communication apparatus terminates the first radio telecommunication link with the base station in response to the terminating signal. Finally, the agent communication apparatus establishes a second radio telecommunication link between the agent communication apparatus and the base station in the radio telecommunication protocol.

Therefore, the communication system and the communication method thereof according to the invention determine whether the mobile communication apparatus is indoors by detecting environmental parameters. If YES, the agent communication apparatus replaces the mobile communication apparatus to establish a radio telecommunication link between the agent communication apparatus and the base station. Thus, a user can use various kinds of provided radio telecommunication services through the base station conveniently by using the agent communication apparatus cooperated with indoor communication links. In addition, the time for putting the mobile communication apparatus in use can be reduced to save power.

The advantage and spirit of the invention may be understood by the following recitations together with the appended drawings.

BRIEF DESCRIPTION OF THE APPENDED DRAWINGS

DETAILED DESCRIPTION OF THE INVENTION

The invention provides a communication system and the communication switching method thereof, and according to the invention, it determines whether the mobile communication apparatus is indoors by detecting environmental parameters. If YES, an agent communication apparatus replaces the mobile communication apparatus to establish a radio telecommunication link between the agent communication apparatus and a base station. Thus, a user can use various kinds of provided radio telecommunication services through the base station conveniently by using the agent communication apparatus cooperated with indoor communication links. In addition, the time for putting the mobile communication apparatus in use can be reduced to save power. The spirit and feature of the present invention will be described in detail by the following preferred embodiments.

Figure 1:
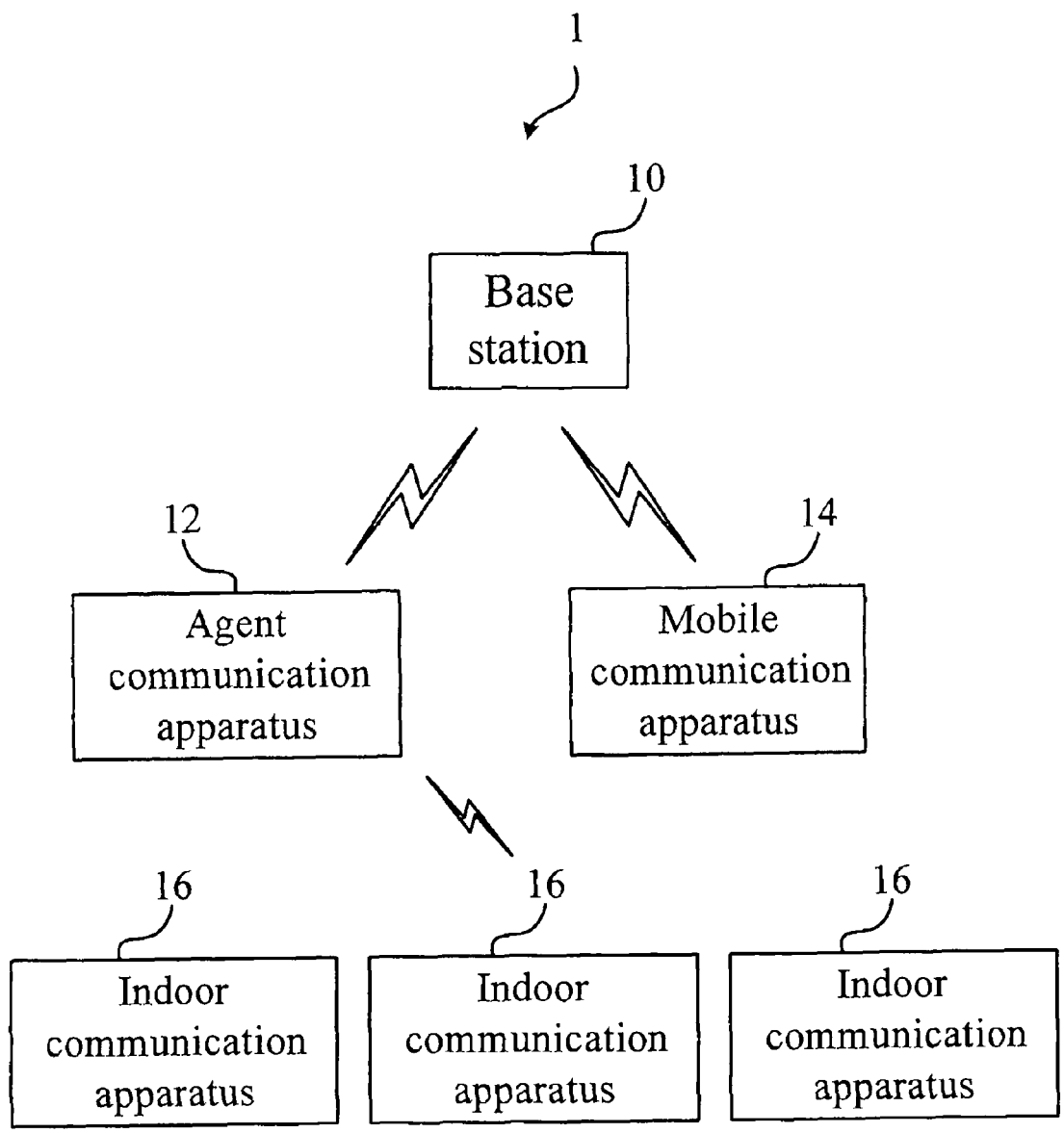
FIG. 1 is a function block diagram illustrating a communication system of a preferred embodiment of the invention.

Please refer to FIG. 1. FIG. 1 is a function block diagram illustrating a communication system 1 of a preferred embodiment of the invention. As shown in FIG. 1, the communication system 1 includes a base station 10, an agent communication apparatus 12, a mobile communication apparatus 14, and at least one indoor communication apparatuses 16. In the embodiment, the communication system 1 according to the invention can switch the mobile communication apparatus 14 with the agent communication apparatus 12 to communicate with the base station 10.

Figure 2:
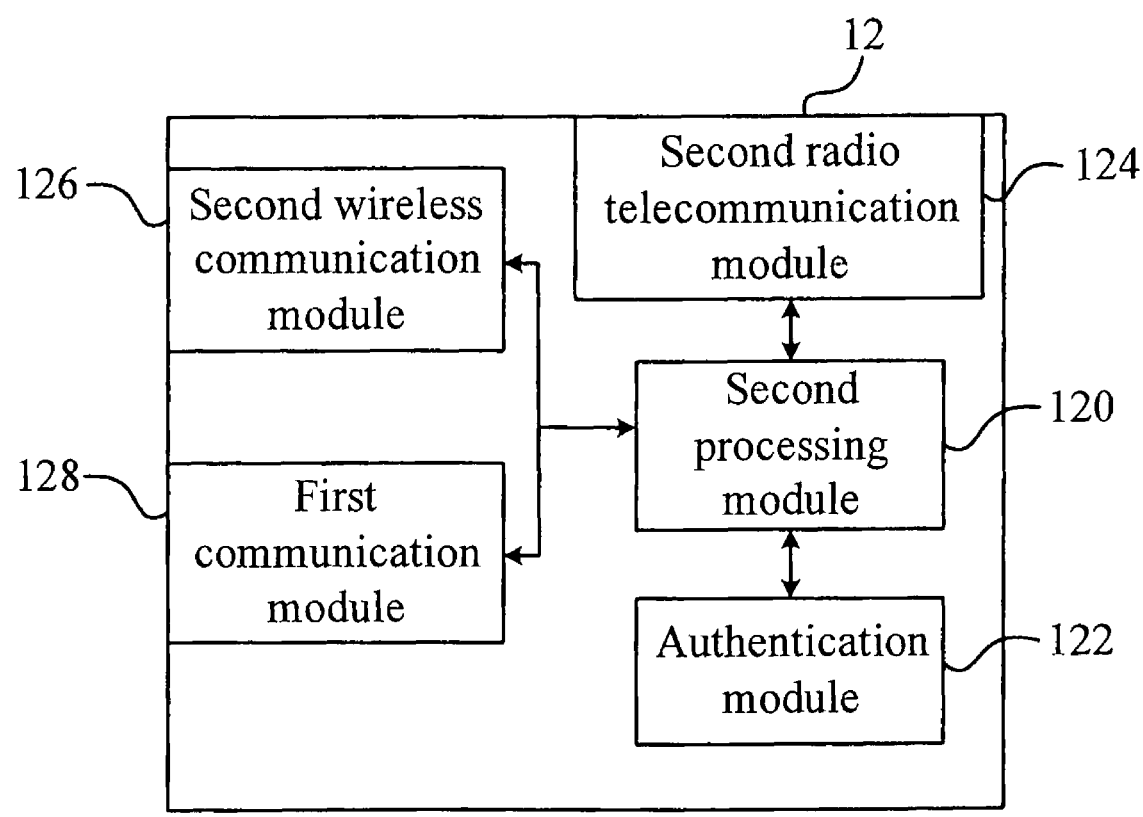
FIG. 2 is a function block diagram illustrating the agent communication apparatus in FIG. 1.

Please refer to FIG. 2. FIG. 2 is a function block diagram illustrating the agent communication apparatus 12 in FIG. 1. As shown in FIG. 2, the agent communication apparatus 12 includes a second processing module 120, an authentication module 122, a second radio telecommunication module 124, a second wireless communication module 126, and a first communication module 128.

Figure 3:
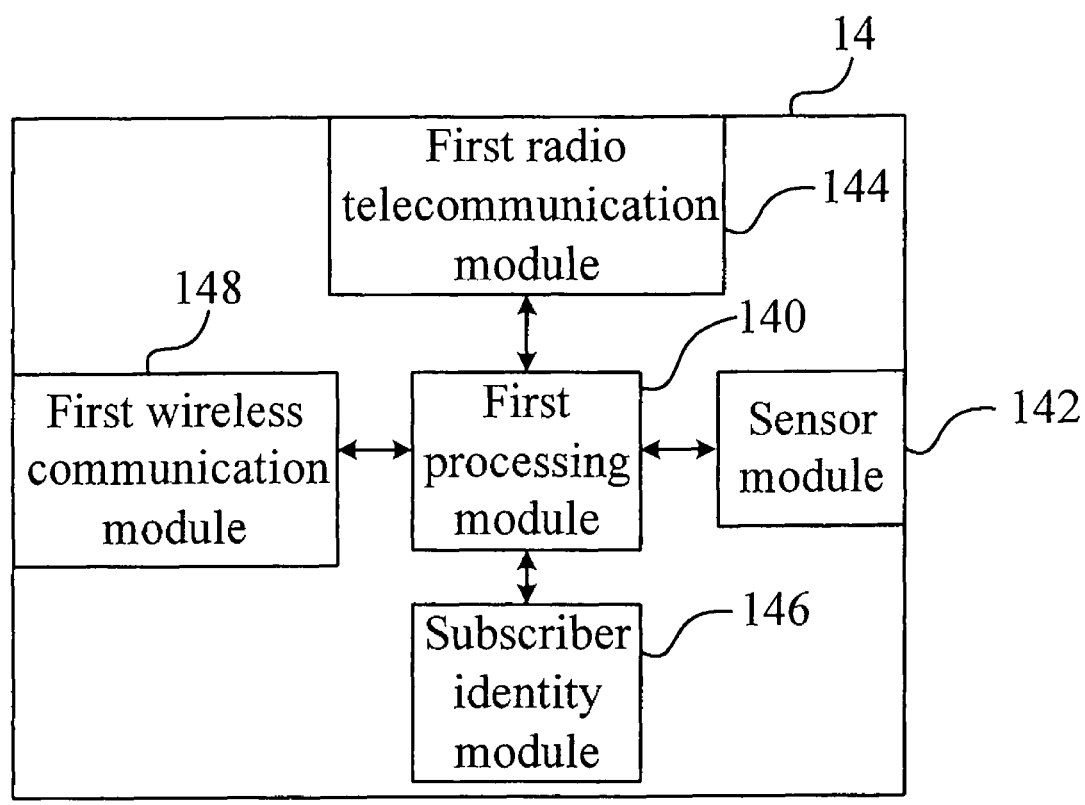
FIG. 3 is a function block diagram illustrating the mobile communication apparatus in FIG. 1.

Please refer to FIG. 3. FIG. 3 is a function block diagram illustrating the mobile communication apparatus in FIG. 1. As shown in FIG. 3, the mobile communication apparatus 14 includes a first processing module 140, a sensor module 142, a first radio telecommunication module 144, a subscriber identity module 146, and a first wireless communication module 148. In a practical application, the mobile communication apparatus 14 can be, but not limited to, a mobile phone.

Figure 4:
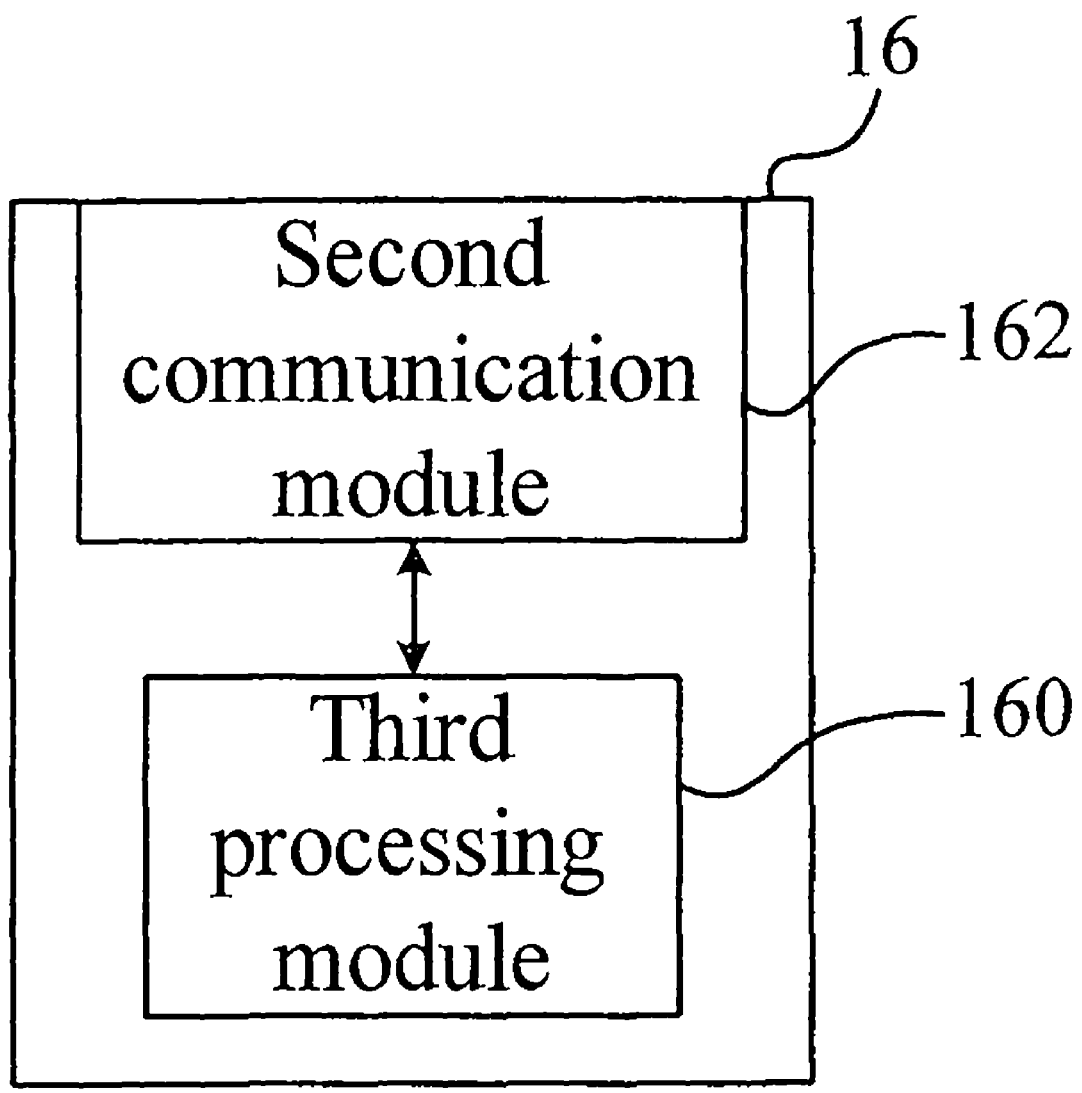
FIG. 4 is a function block diagram illustrating the indoor communication apparatus in FIG. 1.

Please refer to FIG. 4. FIG. 4 is a function block diagram illustrating the indoor communication apparatus in FIG. 1. As shown in FIG. 4, the indoor communication apparatus 16 includes a third processing module 160 and a second communication 162.

The first radio telecommunication module 144 of the mobile communication apparatus 14 can be used to establish a first radio telecommunication link with the base station 10 in a radio telecommunication protocol. The radio communication protocol can be GSM 'GPRS 'EDGE 'WCDMA 'CDMA2000 or the like.

The sensor module 142 of the mobile communication apparatus 14 can be used to measure at least one environmental parameter relative to a neighboring region thereof. The at least one environmental parameter includes a temperature, a color temperature, a humidity, an intensity of an ultraviolet (UV) rays, a noise or the like. Different sensor module 142 which will be selected depends on environmental parameters. For instance, if the at least one environmental parameter is a temperature environmental parameter, the sensor module 142 will be a temperature sensor; if the at least one environmental parameter is a color temperature environmental parameter, the sensor module 142 will be a color temperature sensor. In addition, the sensor module 142 is not limited to be consisted by a single sensor, but is consisted by a plurality of sensors to sense different environmental parameters respectively. The first processing module 140 determines whether the mobile communication apparatus 14 is indoors or not based on the at least one environmental parameter. For instance, a fluorescent lamp indoor has it own particular color temperature range (about 5000K-5500K), and if a color temperature sensor is adopted and the color temperature sensor senses a color temperature in the color temperature range of the fluorescent lamp, the mobile communication apparatus 14 will be determined as being indoors at that time.

In a practical application, when a user carries the mobile communication apparatus 14 from outdoors to indoors, the sensor module 142 will measure at least one environmental parameter relative to the indoor setting. Then, the first processing module 140 of the mobile communication apparatus 14 will determine whether the mobile communication apparatus 14 is indoors based on the at least one environmental parameter.

In a practical application, if the first processing module 140 of the mobile communication apparatus 14 determines that the mobile communication apparatus 14 is indoors, the first processing module 140, through the first communication module 148, will establish a wireless communication link in a wireless communication protocol with the second wireless communication module 126 of the agent communication apparatus 12. Meanwhile, the wireless communication protocol can be a Bluetooth protocol, a Zigbee protocol, a Wi-Fi protocol, an IEEE 802.15.4 protocol, IEEE 802.11-based protocols, a RFID protocol, or the like.

Subsequently, the mobile communication apparatus 14 sends a piece of user information accessible therein to the agent communication apparatus 12 through the first wireless communication module 148. In a practical application, the user information can be, but not limited to, the identified information stored in the subscriber identity module 146 of the mobile communication apparatus 14.

In a practical application, the authentication module 122 of the agent communication apparatus 12 can be used for authenticating the user information. If the user information can not pass the authentication, the mobile communication apparatus 14 will not activate. It means that the mobile communication apparatus 14 can not use the switching service which is provided by the agent communication apparatus 12.

If the user information passes the authentication, the agent communication apparatus 12 will send a terminating signal to the mobile communication apparatus 14. The mobile communication apparatus 14 will terminate the first radio telecommunication link with the base station 10 in response to the terminating signal.

In a practical application, after terminating the first radio telecommunication link with the base station 10, the mobile communication apparatus 14 can stay in sleep mode, such as to shut down any module excepting the sensor module 142 or any one module. The reason why the sensor module 142 is kept switching on is that the sensor module 142 have to wake up other modules to let the mobile communication apparatus 14 communicate with the base station 10 renewedly while the user going outdoors. Since the mobile communication apparatus 14 will not communicate with the base station 10, the power consumption is less and the power can be saved.

Then the second radio telecommunication module 124 of the agent communication apparatus 12 will establish a second radio telecommunication link between the agent communication apparatus 12 and the base station 10 in the radio telecommunication protocol. Thus, a user can use various kinds of provided radio telecommunication services through the base station 10 conveniently by using the agent communication apparatus 12.

In order for the user to conveniently use the telecommunication services at each location indoors where the indoor communication apparatuses 16 is provided, in the practical application, the agent communication apparatus 12 can select one from at least one indoor communication apparatus 16 by a selection method. The selection method includes selecting the indoor communication apparatus 16 by user-defined, determining the position of a user so as to select the indoor communication apparatus 16 near the position by a location method, or selecting the indoor communication apparatus 16 by the location where users most often being therein cooperated with the frequencies of respective indoor communication apparatuses 16 used by the users. Taking the third selection method for an example, the agent communication apparatus 12 can record both the locations where users most often being therein and the frequencies of respective indoor communication apparatuses 16 selected by the users recorded in the database. When the agent communication apparatus 12 selects an indoor communication apparatus 16, the agent communication apparatus 12 firstly recognizes the user, determines a target location according to the places recorded in the database where users often being therein; and finally, cooperated with the target location, selectively bases on the frequencies, recorded in the database, of respective indoor communication apparatuses 16 used by the users to select the indoor communication apparatus 16.

Subsequently, the agent communication apparatus 12 can establish an indoor communication link with the second communication module 162 of the indoor communication apparatus 16 through the first communication module 128. The agent communication apparatus 12 can transceive communication signals with the selected indoor communication apparatus 16 through the indoor communication link, and the communication signals then is further transformed to audio signals, video signals, or text data signals by the third processing module 160 of the indoor communication apparatus 16. Thus, the communication system 1 can inform a user that there is a call or allow the user to communicate with others, such that the user does not need to carry the mobile communication apparatus 14 as a carry-on item.

For instance, when the user has a call, the agent communication apparatus 12 can send a caller-ID) message (such as a ringing signal) to the selected indoor communication apparatus 16 and inform the user that there is a call by the selected indoor communication apparatus 16. When deciding to get the phone call, the user can communicate with the caller by transceiving the communication signals and transforming to audio signals.

Thus, the user can use every kind of provided radio telecommunication services through the base station 10 conveniently by using the agent communication apparatus 12. Moreover, the time for putting the mobile communication apparatus 14 in use can be reduced to save power.

Figure 5:
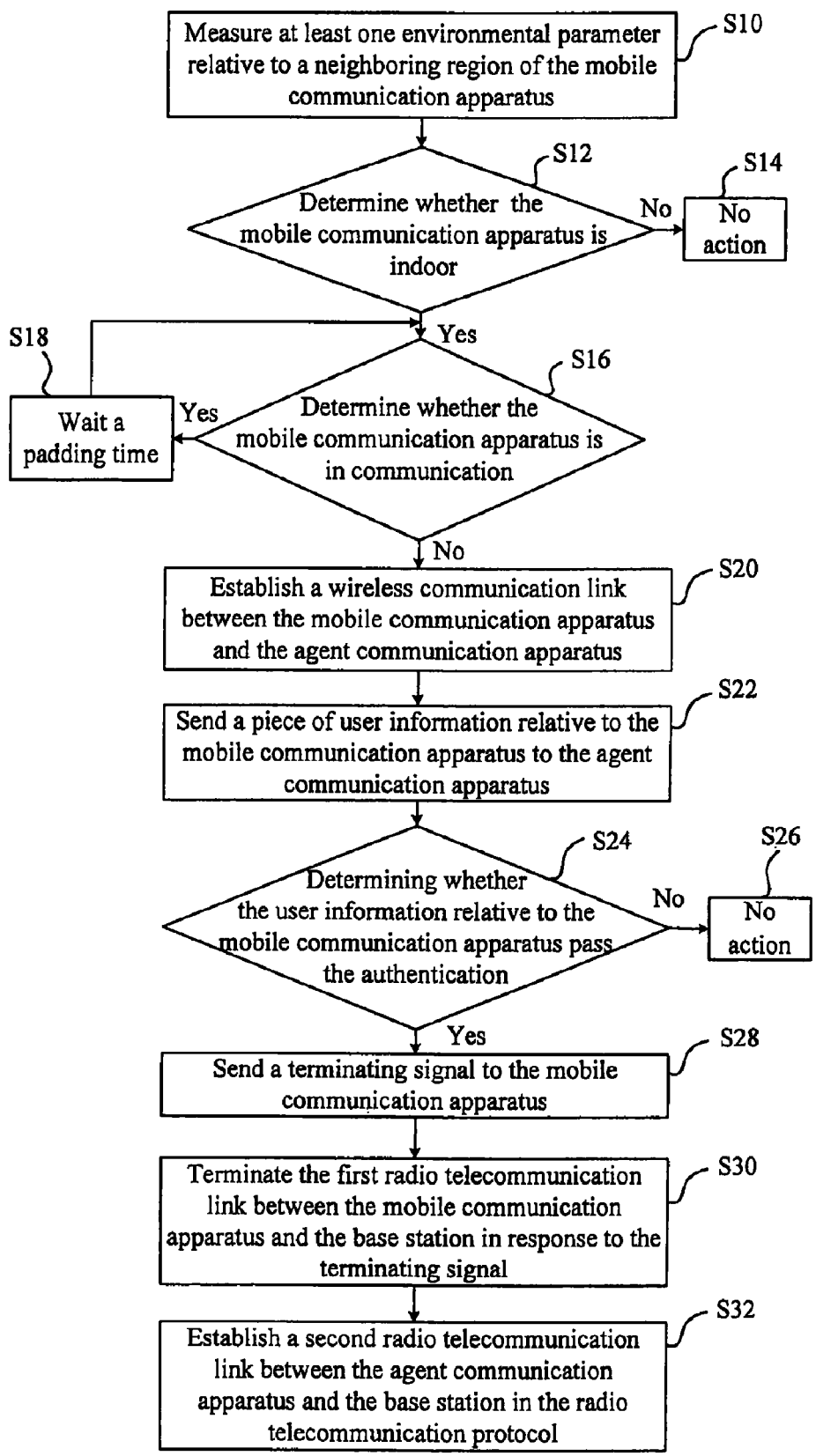
FIG. 5 is a flow chart diagram showing a switching method of a preferred embodiment of the invention.

Please refer to FIG. 5, together with FIG. 1 to FIG. 4. FIG. 5 is a flow chart diagram showing a switching method of a preferred embodiment of the invention. In the embodiment, the method of the invention is used to switch a mobile communication apparatus 14 with an agent communication apparatus 12 to communicate with a base station 10. A first radio telecommunication link between the mobile communication apparatus 14 and the base station 10 is established in a radio telecommunication protocol. The first radio telecommunication protocol can be GSM, GPRS, EDGE, WCDMA, CDMA2000, or the like.

As shown in FIG. 5, the method according to a preferred embodiment of the invention includes the step of firstly executing step S10: measuring at least one environmental parameter relative to a neighboring region of the mobile communication apparatus 14. The at least one environmental parameter can include a temperature, a color temperature, a humidity, an intensity of an ultraviolet (UV) rays, a noise, or the like.

Subsequently, the method includes the step of executing step S12: determining whether the mobile communication apparatus 14 is indoors based on the at least one environmental parameter; if NO, executing step S14; and if YES, executing step S16.

Step S14: no action, which represents that the mobile communication apparatus 14 is outdoor.

Step S16: determining whether the mobile communication apparatus 14 is in communication; if YES, executing step S18; and if NO, executing step S20.

Step S18: waiting a padding time, such as to execute step S16 every several minutes or several seconds renewedly. In addition, step S18 can send a communication over signal to stop the communication, and then execute step S20.

Step S20: establishing a wireless communication link with the agent communication apparatus 12 in a wireless communication protocol. In a practical application, the wireless communication protocol can be a Bluetooth protocol, a Zigbee protocol, a Wi-Fi protocol, an IEEE 802.15.4 protocol, IEEE 802.11-based protocols, a RFID protocol, or the like. Then, the method executes step S22.

Step S22: sending a piece of user information to the agent communication apparatus 12. Subsequently, the method executes step S24. In a practical application, the user information can be, but not limited to, the identified information stored in the subscriber identity module 146 of the mobile communication apparatus 14.

Then, the method executes step S24: determining whether the user information pass the authentication; if NO, executing step S26; and if YES, executing step S28.

Step S26: no action, which represents that the mobile communication apparatus 14 can not use the service of switching communication apparatuses provided by the agent communication apparatus 12.

Step S28: sending a terminating signal to the mobile communication apparatus 14. Subsequently, the method executes step S30.

Step S30: terminating the first radio telecommunication link with the base station 10 in response to the terminating signal. Subsequently, the method executes step S32.

Finally, the method executes step S32: establishing a second radio telecommunication link with the base station 10 in the radio telecommunication protocol. Thus, a user can use every kind of provided radio telecommunication services through the base station 10 conveniently by using the agent communication apparatus 12.

Figure 6:
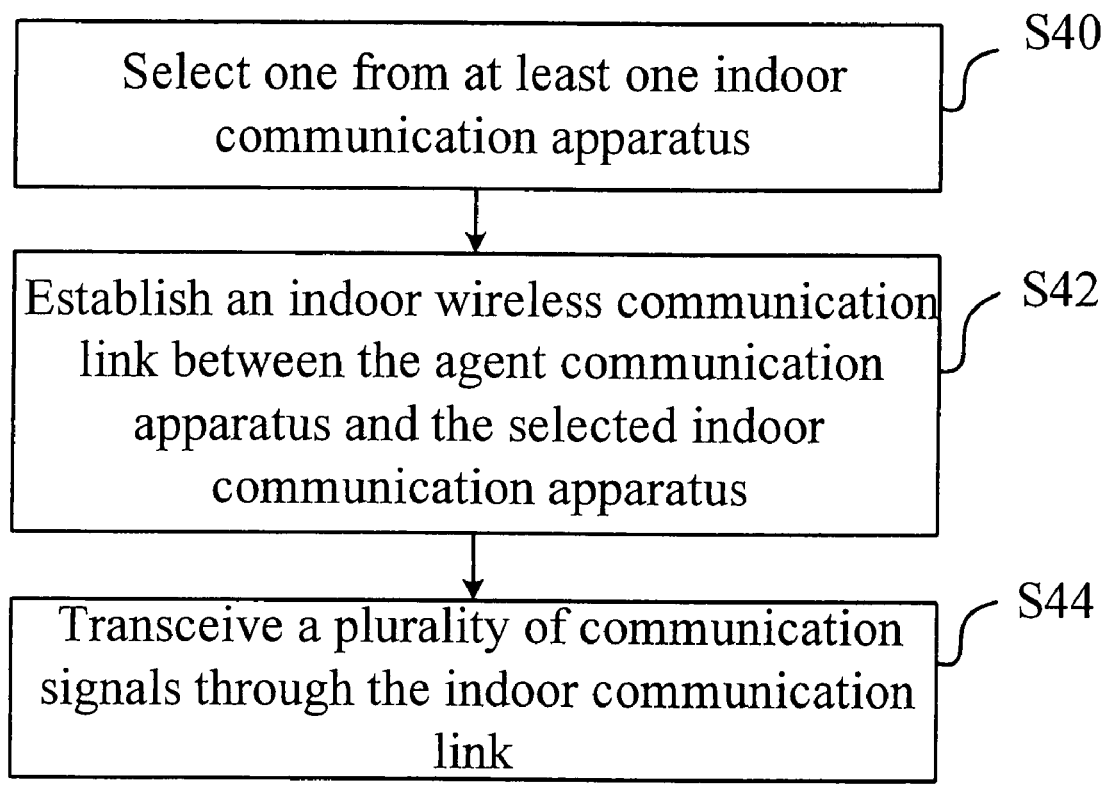
FIG. 6 is a flow chart diagram showing that an indoor wireless communication link established between the agent communication apparatus and the indoor communication apparatus in FIG. 1.

Please refer to FIG. 6. FIG. 6 is a flow chart diagram showing that an indoor wireless communication link established between the agent communication apparatus and the indoor communication apparatus in FIG. 1. As shown in FIG. 6, in a practical application, the method according to an embodiment of the invention further includes the following steps.

Firstly, the method executes step S40: selecting one from at least one indoor communication apparatus 16. In a practical application, the selection method can include selecting the indoor communication apparatus 16 by user-defined, determining the position of a user so as to select the indoor communication apparatus 16 near the position by a location method, or selecting the indoor communication apparatus 16 by the place where users most often being therein cooperated with the frequencies of respective indoor communication apparatuses 16 used by the users. Taking the third selection method for an example, the agent communication apparatus 12 can record both a locations where users most often being therein and the frequencies of respective indoor communication apparatuses 16 selected by the users recorded in a database. When the agent communication apparatus 12 selects an indoor communication apparatus 16, the agent communication apparatus 12 firstly recognizes the user, determines a target location according to the places, recorded in the database, where users most often being therein, and finally cooperated with the target location, selectively bases on the frequencies, recorded in the database, of respective indoor communication apparatuses 16 used by the users to select the indoor communication apparatus 16.

Subsequently, the method executes step S42: establishing an indoor wireless communication link between the agent communication apparatus 12 and the selected indoor communication apparatus 16.

Finally, the method executes step S44: transceiving a plurality of communication signals through the indoor communication link. Thus, the method according to the invention can inform a user that there is a call or allow the user to communicate with others, such that the user does not need to carry the mobile communication apparatus 14 as a carry-on item.

For instance, when the user has a call, the method according to the invention can send a caller-ID message (such as a ringing signal) to the selected indoor communication apparatus 16 and inform the user that there is a call by the selected indoor communication apparatus 16. When deciding to get the phone call; the user can communicate with the caller by transceiving the communication signals and transforming to audio signals.

Of course, the method is not a coactive switching method and can allow users to decide whether to execute the switching action based on users' habits; such as to set a switching button (not shown) on the mobile communication apparatus 14 or the agent communication apparatus 12 to allow the users to set the communication system 1 in automatic switching mode or manual switching mode. For instance, if a user prefers to communicate by a mobile phone, the mobile phone can be set in manual switching mode. Thus, even if the mobile communication apparatus 14 detects that the user is indoors, the mobile communication apparatus 14 will not execute a switching action with the agent communication apparatus 12; in the contrary, if the mobile phone is set in automatic switching mode, the switching steps will be executed as FIG. 5.

Figure 7:
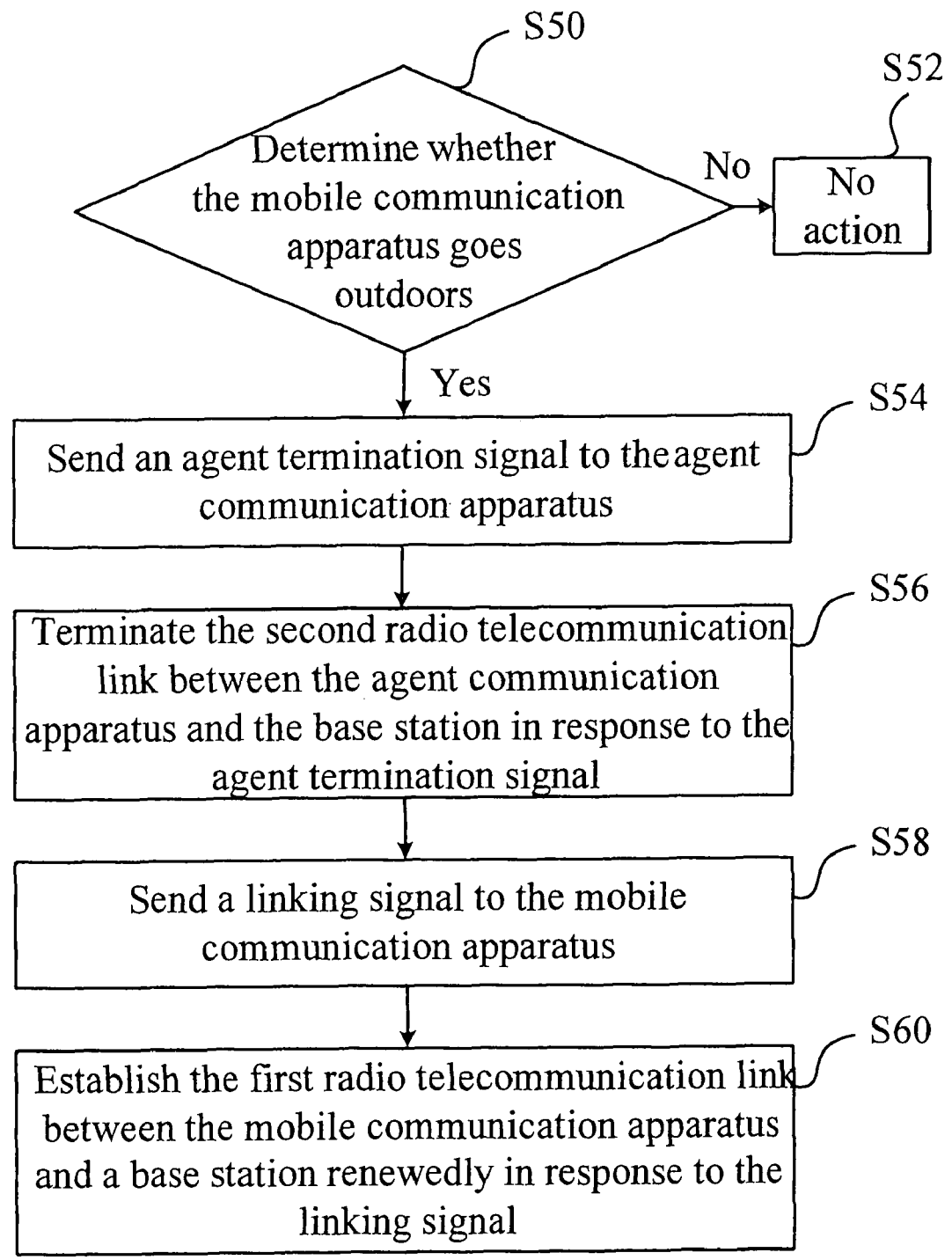
FIG. 7 is a flow chart diagram showing that the mobile communication apparatus establishes the first radio telecommunication link with the base station renewedly.

Please refer to FIG. 7. FIG. 7 is a flow chart diagram showing that the mobile communication apparatus 14 establishes the first radio telecommunication link with the base station 10 renewedly. In a practical application, when the user carries the mobile communication apparatus 14 from indoors to outdoors, the method according to an embodiment of the invention further includes the following steps.

Firstly, the method executes step S50: determining whether the mobile communication apparatus 14 goes outdoors based on the at least one environmental parameter; if NO, executing step S52; and if YES, executing step S54.

Step S52: no action, which represents that the mobile communication apparatus 14 is still indoor.

Step S54: sending an agent termination signal to the agent communication apparatus 12.

Subsequently, the method executes step S56: terminating the second radio telecommunication link between the agent communication apparatus 12 and the base station 10 in response to the agent termination signal. Subsequently, the method executes step S58.

Then, the method executes step S58: sending a linking signal to the mobile communication apparatus 14. Subsequently, the method executes step S60.

Finally, the method executes step S60: establishing the first radio telecommunication link between the mobile communication apparatus 14 and a base station 10 renewedly in response to the linking signal. Thus, when the user carries the mobile communication apparatus 14 from indoors to outdoors, the first radio telecommunication link between the mobile communication apparatus 14 and the base station 10 can be recovered.

Comparing with prior arts, the communication system and the communication switching method thereof according to the invention determine whether the mobile communication apparatus is indoors by detecting environmental parameters. If YES, an agent communication apparatus replaces the mobile communication apparatus to establish a radio telecommunication link between the agent communication apparatus and a base station. In so doing, a user can use various kinds of provided radio telecommunication services through the base station conveniently by using the agent communication apparatus cooperated with indoor communication links. As a result, the user does not need to carry the mobile communication apparatus as a carry-on item. In addition, the time for putting the mobile communication apparatus in use can be reduced to save power.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A method for switching a mobile communication apparatus with an agent communication apparatus to communicate with a base station, a first radio telecommunication link between the mobile communication apparatus and the base station being established in a radio telecommunication protocol, said method comprising the steps of:

(a) measuring at least one environmental parameter relative to a neighboring region of the mobile communication apparatus; and (b) determining whether the mobile communication apparatus is indoors based on the at least one environmental parameter; if YES, executing step (c);

(c) determining whether the mobile communication apparatus is in communication; if NO, executing step (d); if YES, executing the step (c) after waiting a padding time;

(d) establishing a wireless communication link between the mobile communication apparatus and the agent communication apparatus in a wireless communication protocol;

(e) sending a user information to the agent communication apparatus;

(f) sending a terminating signal to the mobile communication apparatus;

(g) terminating the first radio telecommunication link between the mobile communication apparatus and the base station in response to the terminating signal; and (h) establishing a second radio telecommunication link between the agent communication apparatus and the base station in the radio telecommunication protocol.

2. The method of claim 1, wherein the at least one environmental parameter each comprises one selected from the group consisting of a temperature, a color temperature, a humidity, an intensity of an ultraviolet (UV) rays, and a noise.

3. The method of claim 1, wherein the wireless communication protocol is one selected from the group consisting of a Bluetooth protocol, a Zigbee protocol, a Wi-Fi protocol, an EEE 802.15.4 protocol, IEEE 802.11-based protocols, and a RFID protocol.

4. The method of claim 1, wherein the user information is the identified information stored in a Subscriber Identity Module (SIM) of the mobile communication apparatus.

5. The method of claim 1, further comprising the step of authenticating the user information.

6. The method of claim 1, wherein the radio telecommunication protocol is one selected from the group consisting of GSM, GPRS, EDGE, WCDMA, and CDMA2000.

7. The method of claim 1, further comprising the steps of:
selecting one from at least one indoor communication apparatus by a selection method;
establishing an indoor wireless communication link between the agent communication apparatus and the selected indoor communication apparatus; and
transceiving a plurality of communication signals through the indoor communication link.

8. The method of claim 7, wherein the selection method is user-defined.

9. The method of claim 7, wherein the selection method determines the position of a user so as to select the indoor communication apparatus near the position by a location method.

10. The method of claim 7, wherein the selection method selects the indoor communication apparatus by the location where users most often being therein cooperated with the frequencies of respective indoor communication apparatuses selected by the users.

11. The method of claim 1, further comprising the steps of:
determining whether the mobile communication apparatus goes outdoors based on the at least one environmental parameter; if YES, executing the steps of;
sending an agent termination signal to the agent communication apparatus;
terminating the second radio telecommunication link between the agent communication apparatus and the base station in response to the agent termination signal;
sending a linking signal to the mobile communication apparatus; and
establishing the first radio telecommunication link between the mobile communication apparatus and a base station renewedly in response to the linking signal.

12. A communication system, comprising:
a base station;
an agent communication apparatus; and
a mobile communication apparatus, capable of measuring at least one environmental parameter relative to a neighboring region thereof, determining whether the mobile communication apparatus is indoors based on the at least one environmental parameter; if NO, establishing a first radio telecommunication link with the base station in a radio telecommunication protocol; if YES, establishing a wireless communication link with the agent communication apparatus in a wireless communication protocol, and sending a user information to the agent communication apparatus; the agent communication apparatus sending a terminating signal to the mobile communication apparatus; the mobile communication apparatus terminating the first radio telecommunication link with the base station in response to the terminating signal, and the agent communication apparatus then establishing a second radio telecommunication link between the agent communication apparatus and the base station in the radio telecommunication protocol.

13. The communication system of claim 12, wherein the at least one environmental parameter each comprises at least one selected from the group consisting of a temperature, a color temperature, a humidity, an intensity of an ultraviolet (UV) rays, and a noise.

14. The communication system of claim 12, wherein the wireless communication protocol is one selected from the group consisting of a Bluetooth protocol, a Zigbee protocol, a Wi-Fi protocol, an IEEE 802.15.4 protocol, IEEE 802.11-based protocols, and a RFID protocol.

15. The communication system of claim 12, wherein the user information is the identified information stored in a Subscriber Identity Module (SIM) of the mobile communication apparatus.

16. The communication system of claim 12, wherein the agent communication apparatus further comprises an authentication module for authenticating the user information.

17. The communication system of claim 12, wherein the radio telecommunication protocol is one selected from the group consisting of GSM, GPRS, EDGE, WCDMA, and CDMA2000.

18. The communication system of claim 12, further comprising at least one indoor communication apparatus, wherein the agent communication apparatus is capable of selecting one from at least one indoor communication apparatus by a selection method, establishing an indoor wireless communication link between the agent communication apparatus and the selected indoor communication apparatus, and transceiving a plurality of communication signals through the indoor communication link.

19. The communication system of claim 18, wherein the selection method is user-defined.

20. The communication system of claim 18, wherein the selection method determines the position of a user so as to select the indoor communication apparatus near the position by a location method.

* * * * *